United States Patent [19]
Abdel-Mottaleb et al.

[11] Patent Number: 5,915,038
[45] Date of Patent: *Jun. 22, 1999

[54] USING INDEX KEYS EXTRACTED FROM JPEG-COMPRESSED IMAGES FOR IMAGE RETRIEVAL

[75] Inventors: Mohamed Saeed Abdel-Mottaleb, Ossining, N.Y.; Michael O. Shneier, Potomac, Md.

[73] Assignee: Philips Electronics North America Corporation, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/697,465

[22] Filed: Aug. 26, 1996

[51] Int. Cl.$^6$ ...................................................... H04N 1/41
[52] U.S. Cl. ........................... 382/209; 382/224; 382/232; 358/426
[58] Field of Search ................................ 358/426, 262.1, 358/403, 261.4, 432, 435; 382/209, 224, 232, 235, 248, 250; 395/792, 605, 803, 773, 328, 207, 209, 222, 350, 615, 807

[56] References Cited

U.S. PATENT DOCUMENTS

| | | | |
|---|---|---|---|
| 4,817,050 | 3/1989 | Kamatsu et al. | 358/403 |
| 5,131,054 | 7/1992 | Smith | 382/161 |
| 5,325,297 | 6/1994 | Bird et al. | 395/792 |
| 5,412,592 | 5/1995 | Krishnamoorthy et al. | 365/49 |
| 5,550,965 | 8/1996 | Gabbe et al. | 395/773 |
| 5,579,471 | 11/1996 | Barber et al. | 382/209 |
| 5,592,375 | 1/1997 | Salmon et al. | 395/207 |
| 5,602,936 | 2/1997 | Green et al. | 382/140 |
| 5,727,092 | 3/1998 | Sandford, II et al. | 382/235 |
| 5,745,610 | 4/1998 | Johnson | 358/403 |

OTHER PUBLICATIONS

Bibliography A.
Bibliography B.
Bibliography C.
H.V. Jagadish, "A Retrieval Technique for Similar Shapes", pp. 208–217.
Patrick M. Kelly et al, Query by image example: the CANDID approach, SPIE vol. 2420/ pp. 238–248.
Toshikazu Kato et al, "A Method Retrieval Method for Full Color Image Database", IEEE 1992, pp. 530–533.
"Retrieving (JPEG) Pictures in Portable Hypermedia Documents", by Dick C.A. Bulterman, pp. 217–226.
"The JPEG Still Picture Compression Standard", by Gregory K. Wallace, Communications of the ACM, Apr. 1991, vol. 34, No. 4, pp. 32–45.

*Primary Examiner*—Edward L. Coles
*Assistant Examiner*—Cheukfan Lee
*Attorney, Agent, or Firm*—Anne E. Barschall

[57] ABSTRACT

Index keys from JPEG encoded still images are extracted based on the gray-scale, luminance, and/or chrominance values. The index keys are stored in a database, along with corresponding location, and size information. The index key of a query image, also encoded in the JPEG format, is extracted. The index key of the image query is compared with the index keys stored in the meta database, with still images having index keys similar to the index key of the query image identified. The still images are then retrieved and displayed by selection of a user.

20 Claims, 9 Drawing Sheets

USING INDEX KEYS EXTRACTED FROM JPEG-COMPRESSED IMAGES FOR IMAGE RETRIEVAL

BACKGROUND OF THE INVENTION

1. Field of the Invention

The present invention relates to storing and retrieving still images from large digital still image archives when the still images are encoded using the JPEG (Joint Photographic Experts Group) encoding standard, and specifically to the extraction, based on the coefficients of the Discrete Cosine Transforms, of still image index keys from JPEG encoded still images, and to the search for and retrieval of still images based on the extracted index keys.

2. Description of the Related Art

Managing large collections of images was once only a problem for specialists in fields such as remote sensing, intelligence-gathering, and medical imaging. With the growth of multimedia computing and the spread of the INTERNET, an increasing number of people can display and manipulate images, and use them for a variety of applications.

JPEG is an encoding standard used for digitally encoding, typically with a computer, still images for use in the information processing industry. With the JPEG encoding standard, still images can be stored on CD-ROMs, magnetic storage such as hard drives, diskettes, and tape. Further, the JPEG encoding standard allows still images to be transmitted through computer networks such as ISDN, wide area networks, local area networks, the INTERNET, the INTRANET and other communication channels.

The JPEG standard for compressing images is mostly used as a lossy compression scheme. JPEG can also be configured as a lossless method. The JPEG compression standard is described in "The JPEG Still Picture Compression Standard", by Gregory T. Wallace, *Communications of the ACM*, April 1991, vol. 34, No. 4, pp. 31–44, incorporated by reference herein.

JPEG uses a combination of spatial-domain and frequency-domain coding. For grayscale images, the image is first divided into 8×8 pixel blocks, each of which is transformed into the frequency domain using the Discrete Cosine Transform (DCT). Each block of the image is thus represented by 64 frequency components. The signal carrying the JPEG-encoded image tends to concentrate in lower spatial frequencies, enabling high-frequency components (many of which are usually zero) to be discarded without substantially affecting appearance of the image.

A main source of loss of information in JPEG-encoded images is a quantization of the DCT coefficients. A table of quantization coefficients is used, one per coefficient, usually related to human perception of the different frequencies. The quantized coefficients are ordered in a "zig-zag" sequence by the JPEG compression scheme, starting at the upper left (which is the DC coefficient), and scanning the matrix of coefficients diagonally, since most of the energy lies in the first few coefficients. As a result, most non-zero values appear early in the sequence of coefficient values.

The final step is entropy coding of the coefficients, using either Huffman coding or arithmetic coding.

With the JPEG encoding standard, color image compression can be approximated by compression of multiple grayscale images. In the JPEG encoding standard, color representation is YCrCb, a color scheme in which the luminance component and chrominance components are separated. Y is a luminance component of color, and CrCb are two components of chrominance of color. For each four pixels of luminance, one pixel of Cr and one pixel of Cb is present. In the JPEG encoding standard, the chrominance information is subsampled at one-half of a luminance rate in both the horizontal and vertical directions, giving one value of Cr and one value of Cb for each 2×2 block of luminance pixels. Chrominance and luminance pixels are organized into 8×8 pixel blocks (or blocks). Pixel blocks are transformed into the frequency domain using the DCT operation, resulting in DC and AC components corresponding to the pixel blocks.

A macro block comprises four 8×8 blocks of luminance pixels and one 8×8 block for each of two chrominance (chroma) components. Therefore, a macroblock comprises the DCT coefficients for four 8×8 blocks of luminance pixels and one 8×8 block for each of two chrominance coefficient pixels.

A problem in the related art is that most image databases are not indexed in useful ways, and many are not indexed at all. Creating an index of images, then, is a formidable task using technology of the related art.

SUMMARY OF THE INVENTION

An object of the present invention is to index image databases by creating an index of the images stored in the image databases.

Another object of the present invention is to retrieve images from a large database using an image as a query.

A further object of the present invention is to create an index that allows retrieval of images similar to a given query image.

Another object of the present invention is to extract index keys from images.

A further object of the present invention is to identify and retrieve images that are of the same type (i.e., given an image of a person's face, then other images of people's faces are retrieved; while given an image of a document, then other documents are retrieved).

Still another object of the present invention is to extract index keys from still images digitally-encoded, using the JPEG encoding standard, based on the components of the DCT coefficients.

A further object of the present invention is to compare JPEG images to a given query image relatively quickly, without having to fully decompress the images.

An additional object of the present invention is to retrieve from local or remote databases still images similar to a query still image using index keys of the database still images and the query still image.

A further object of the present invention is to archive index keys of JPEG compressed images.

Still another object of the present invention is to re-encode still images previously encoded using encoding standards other than the JPEG encoding format, and extract and store index keys therefrom.

A further object of the present invention is a retrieval method that takes a still image as a query and searches a database for still images with similar content, facilitating retrieval of still images from large databases.

An additional object of the present invention is to filter images in a large database, and classify the images according to a measure of the differences between each of the images and a given image.

An object further still in the present invention is to create image index keys in the JPEG compressed domain and without reconstructing the image arrays.

In accordance with the present invention, in still images encoded using the JPEG encoding standard, DCT components are determined conventionally. The present invention is applicable to extracting index keys from grayscale images. In addition, the present invention is also applicable to extracting index keys based on color images, which color information is determined conventionally.

The present invention is a computer-implemented process which takes advantage of JPEG-encoded still images to decrease the amount of data that must be processed and to provide the basis for index keys used for retrieval of similar images. In the present invention, an index key or a set of index keys are constructed for each image. The index keys can be pre-computed for an image database, or can be computed for each image during the retrieval. Pre-computing is preferable to increase performance, but is at times not possible as in the case of images being retrieved over the INTERNET. In accordance with the present invention, an index key comprises coefficient keys. Each coefficient key corresponds to one of the 64 DCT coefficients resulting from JPEG-encoding of the image and comprises a predetermined, fixed number of bits selected by a user.

In the present invention, still images are first encoded using the JPEG encoding standard. Then, a number of bits to be used for the coefficient key within the index key is chosen and remains the same for each image. A number of windows is selected as twice the number of bits in each coefficient key. The placement of the windows within each still image is identified, and remains the same for each image. Each window within the still image is then paired with another window within the still image. For each pair of windows and each DCT coefficient, one bit in the index key is allocated. Next, for each window in the still image, a vector of features is calculated, based upon the components of the DCT coefficients of the JPEG-encoded still image. Lastly, the bits of the index key for the still image are calculated, based upon a difference in values between the vector of features in one window in each window pair and the other, corresponding window in each window pair.

In accordance with the present invention, an index key is computed for a query image (an image identified by the user for use in retrieving other, similar images), and an index key is computed for each, corresponding image being searched. Then, and also in accordance with the present invention, the index key corresponding to the query image is compared with each index key of the corresponding images being searched. For each index key being compared with the index key corresponding to the query image, a measure of the differences between the index key corresponding to the query image and each index key being searched is calculated. Each measure of differences is ordered with respect to other measures of differences or is compared against a user-determined threshold level previously selected. For each index key of the images searched with "lower" measures of differences between (which are the index keys most similar to) the index key of the query image, the corresponding image is retrieved and displayed to the user. The "lower" measures of differences between the index key of the query image and index keys of each, corresponding image being searched are relative to the other index keys being compared to the index key of the query image.

These together with other objects and advantages which will be subsequently apparent, reside in the details of the construction and operation as more fully herein after described and claimed, reference being had to the accompanying drawings forming a part hereof, wherein like numerals referred to like parts throughout.

BRIEF DESCRIPTION OF THE DRAWINGS

Further details of the present invention are explained below, with the aid of the attached drawings, in which.

DESCRIPTION OF THE PREFERRED EMBODIMENTS

There are two main aspects of the present invention, explained below:

(1) index key extraction and archival, and (2) retrieval of still images using index keys.

Index key extraction and archival refers to extracting index keys of still images and storing the extracted index keys of the still images in a database. Retrieval refers to extracting the index key from a query image (which query image is one designated by the user for which other, similar still images are to be identified), then comparing that query image index key against the index keys representing the images being searched, which index keys are stored in the database.

An index key can be extracted, in the present invention, from a still image partially encoded using the JPEG encoding standard. A still image at least partially encoded for index key extraction in the present invention is encoded (using the JPEG standard) at least to the level of having DCT coefficients, without arithmetic coding or Huffman coding. In addition, an index key can be extracted from a still image at least partially decoded (Huffman or arithmetic decoded), and having DCT coefficients, in accordance with the present invention. The method of index key extraction in accordance with the present invention is preferably applied to a partially JPEG-encoded image, which is Huffman (or arithmetic) decoded. Further, an image which has not been JPEG-encoded or has been digitally encoded using a standard other than JPEG encoding, or has been Huffman or arithmetic encoded, is preprocessed by the present invention to place the image into the above-mentioned partially JPEG-encoded, Huffman (or arithmetic) decoded, format for index key extraction.

Figure 1:
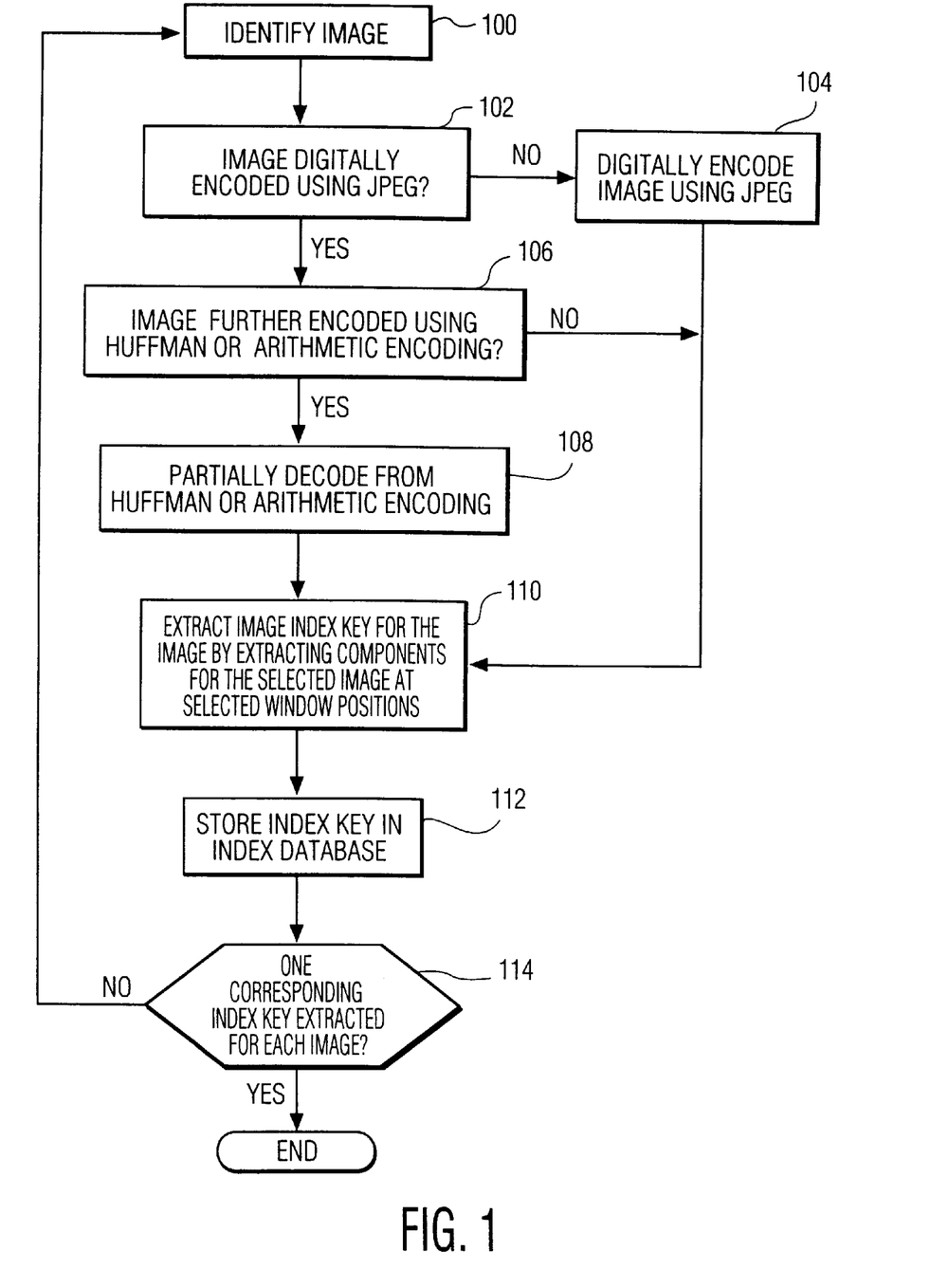
FIG. 1 is a flow chart of an overview of index key extraction from still images, in the present invention.

FIG. 1 is a flow chart of an overview of index key extraction from still images in the present invention. Referring now to FIG. 1, in step 100, a user first identifies an image or a database of images for which corresponding index keys are to be extracted. As shown in step 102, a query is first made to determine whether the image is digitally encoded using the JPEG encoding standard. If not, then in step 104, the image is digitally encoded, to the stage of deriving the DCT coefficients, using the JPEG encoding standard either by encoding the image for the first time or by decoding the image encoded using a conventional encoding standard different from the JPEG encoding standard, then JPEG re-encoding the image. If the image is digitally encoded using the JPEG encoding standard, then in step 106, a query is made to determine whether the image is encoded using Huffman or arithmetic encoding. If so, in step 108, the image is partially decoded from Huffman or arithmetic encoding.

At the beginning of step 110, then, the image is digitally encoded using the JPEG encoding standard, without being further encoded using Huffman or arithmetic encoding. As shown in step 110, the image index key for the image is extracted. To extract the index key, DC components of the DCT coefficients may be determined and compared for each selected window pair within the image (which will be explained in more detail with respect to FIG. 6). In the example shown in FIG. 1, DC components of the DCT coefficients are used to extract image index keys. However, components of the DCT coefficients other than the DC components may be used (or may be used in conjunction with the DC components) to extract image index keys. In extracting multiple image index keys for one image, all components of the DCT coefficients may be used.

The index key is then stored, as shown in step 112, in an index key database allocated for the type of index key extracted (i.e., in the example of FIG. 1, index keys are extracted using DC components of the DCT coefficients).

If at least a single corresponding index key has not been extracted at the point of step 114 for each image, steps 100–114 are repeated until at least one corresponding index key has been extracted for each image.

In accordance with the present invention, each image may have more than one index key, due to factors such as a difference in window placement within the image or the number of bits used in forming the query image, and other factors. However, to have a meaningful comparison between index keys, then the above-mentioned factors should remain constant for each image being compared.

Figure 2:
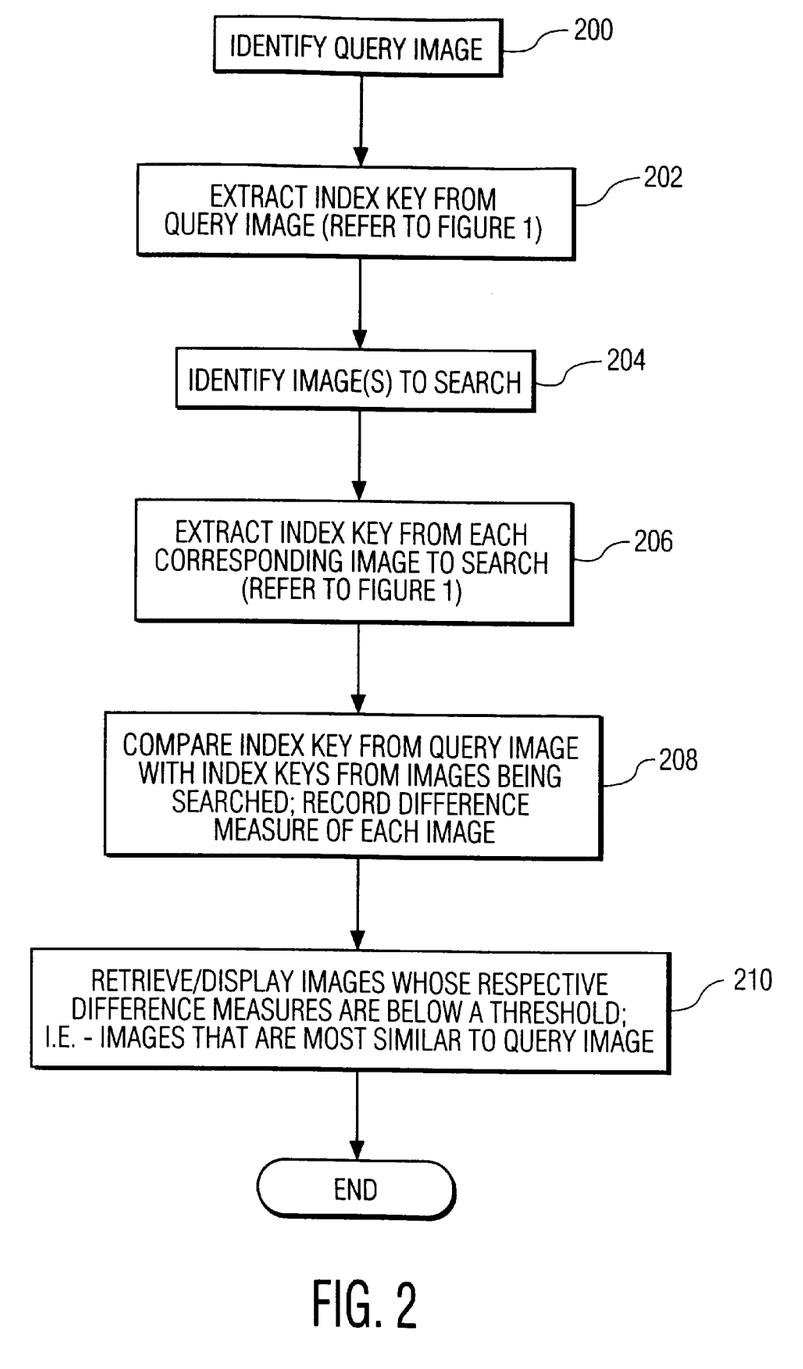
FIG. 2 is a flow chart of an overview of retrieval of images similar to the query image, in the present invention.

FIG. 2 is a flow chart of an overview of the retrieval of images similar to the query image in the present invention. As shown in FIG. 2, a query image, selected by the user, is identified in step 200 as the image for which similar images are to be identified and retrieved. In step 202, the index key is obtained from the query image; the index key could have been previously extracted and stored in a database or could be extracted from the query image in step 202.

As shown in step 204, images to be searched and compared to the query image are identified by the user. The images to be searched could be identified, for example, by identifying a database storing images, by identifying an image input source inputting images or by identifying an INTERNET Web site. Without departing from the present invention, the user could also identify individual images for which difference measures are to be calculated.

In step 206, an index key corresponding to each image being searched is extracted. If 100 images are to be searched, 100 total index keys are extracted, with one index key corresponding to each image. As explained above, the index keys could have been previously extracted and stored in a database, in which case the database is searched for similarity to the index key extracted from the query image. Also as explained above, each image may have multiple index keys based upon different components, or different combinations of components, of the DCT coefficients for that image. However, for meaningful image retrieval using index keys, then comparison between index keys extracted using the same components of the DCT coefficients should be made.

As shown in step 208, the index key extracted from the query image is compared with each index key extracted from the images being searched. A difference measure for each comparison is recorded. The difference measure is recorded as a difference between the index key extracted from the query image and the index key extracted from the search image. Therefore, the lower the number for the difference measure, the more similar to each other are the two images corresponding to the index keys being compared.

Next, as shown in step 210, images for which the corresponding difference is less than a user-determined threshold (i.e., which are most similar to the query image) are retrieved and displayed to the user.

Figure 3:
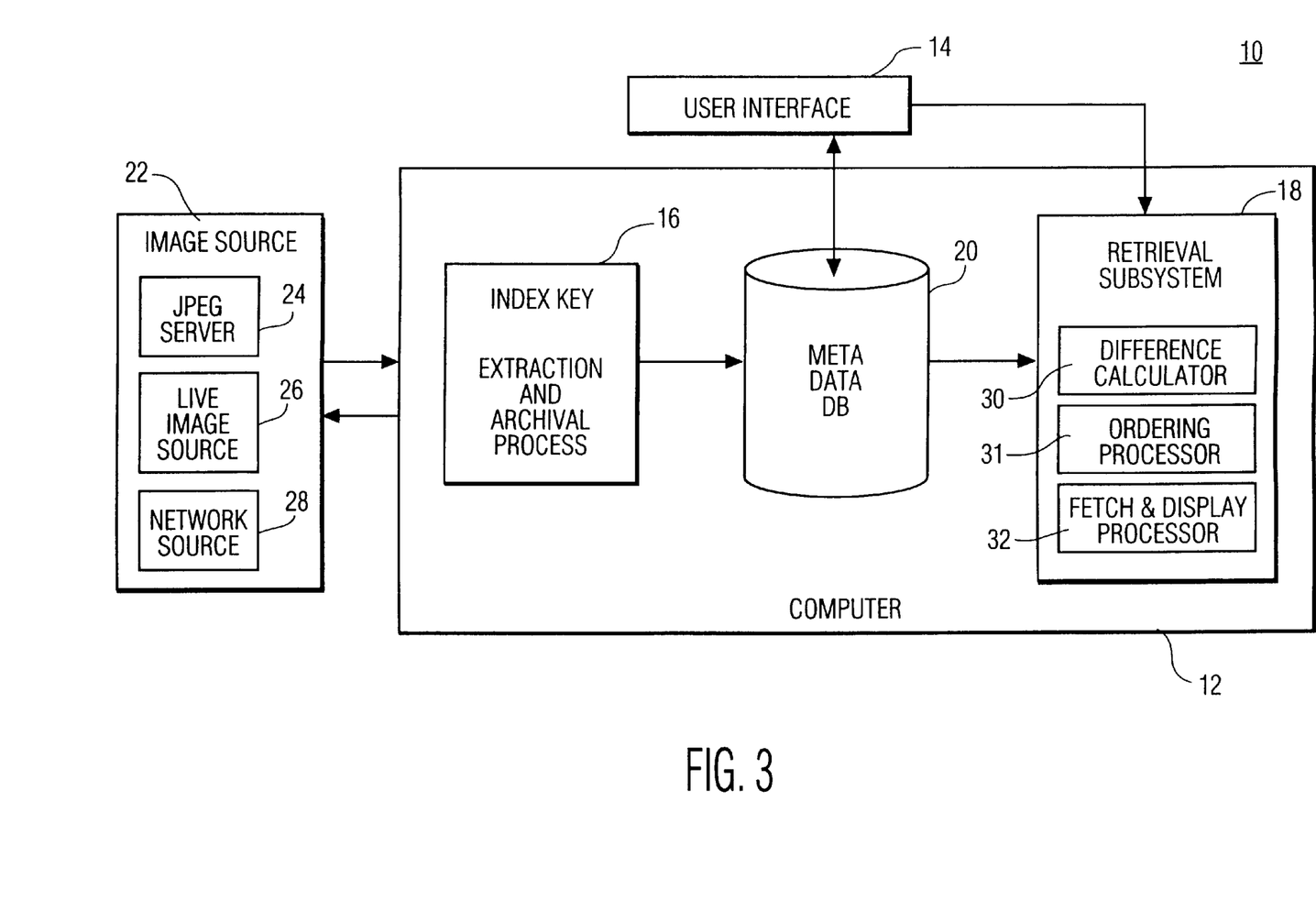
FIG. 3 is a block diagram of the system architecture for a computer-based implementation of the present invention.

In a preferred embodiment of the present invention, an index key extraction and storage system 10 is a computer-based system, as shown FIG. 3. The computer implementing the index key and storage system 10 could be, for example, a SUN™ workstation or a Pentium™-based personal computer. Index key extraction and storage system 10 includes an image information retrieval system 12 and an image source 22. In a preferred embodiment of the present invention, as shown in FIG. 3, a user interface 14, an index key extraction and archival process 16, and a retrieval subsystem 18 are software programs running on the computer implementing index key extraction and storage system 10. Meta database 20 is a database storing extracted index keys.

Also part of the index key extraction and storage system 10 is the image source 22. Image source 22 provides still images to the image information retrieval system 12 from three sources: a JPEG server 24, a live image source 26, and a network source 28. Other sources of images, of course, are possible. The still images could be already digitally encoded in the JPEG format and provided by JPEG server 24. Further, the still images may be provided from live images, which is provided by live image source 26, or encoded in the JPEG format or in a format other than JPEG, which are provided by network source 28.

Each of JPEG server 24, live image source 26, and network source 28 may interface to other, respective sources providing still images thereto and which are not shown in FIG. 3. A representative source to which JPEG server 24 interfaces is the INTERNET, which may store still images at remote sites on computers running the UNIX™ operating system.

Image source 22 provides to the image information retrieval system 12, still images from each of the foregoing sources. If still images are provided to the image information retrieval system 12 from JPEG server 24, no further encoding is necessary before extraction of the index keys. However, Huffman-decoding or arithmetic-decoding may be necessary, which is accomplished by the present invention.

On the other hand, if live image source 26 provides live images to image information retrieval system 12, the live images must be compressed by the present invention using the JPEG encoding standard before the index keys are extracted. For example, a still image camera or other image source with image capture capability may interface to live image source 26.

Likewise, if still images are provided by the network source 28 to the image information retrieval system 12, the still images may have been encoded in a format other than the JPEG format; subsequently, the still images must be partially re-encoded by the present invention using the JPEG encoding standard (without being Huffman- or arithmetic-encoded) before extraction of the index keys may occur.

In the present invention, still images requiring encoding into the JPEG format are encoded in a conventional way, using conventional computer hardware and software.

After the JPEG-encoded still images are received by the image information retrieval system 12, the index key extraction and archival process 16 extracts a corresponding index key from each still image.

In addition, the index key extraction and archival process 16 stores the extracted index keys in meta database 20. Meta database 20 is referred to as a "meta" database because data that describe other data (i.e., index keys of still images and other descriptive data thereof such as location from which the still image was retrieved, size of the still image, title of the image, etc.) are stored therein. The index key extraction and archival process 16, in a preferred embodiment, is implemented in software on any UNIX™-based computer, personal computer, or other platform, and accomplishes all of the above-mentioned encoding/re-encoding/partially decoding required to place the images into the JPEG partially-encoded format discussed above. The index key extraction and archival process 16 could also be part of JPEG encoder or JPEG decoder hardware implementation board.

On the other hand, if the index key extraction and archival process 16 receives still images from live image source 26, the index key extraction and archival process 16 compresses or partially compresses in a conventional way the still images using the JPEG encoding standard, extracts the index keys from the compressed JPEG still images, and stores the extracted index keys in meta database 20. Similarly, if the network source 28 transmits still images to the index key extraction and archival process 16, then the index key extraction and archival process 16 re-encodes the still images into the JPEG format, extracts the index keys from the re-encoded JPEG still images, and stores the index keys in the meta database 20.

Along with the extracted index keys, the index key extraction and archival process 16 stores in the meta database 20, other identifying information, such as the location at which the corresponding still image is stored, the size of the still image in bytes, and the title of the still image.

Referring again to FIG. 3, the image information retrieval system 12 uses the index key extracted from a query image by the present invention to search the meta database 20 for index keys of still images similar thereto. In addition, the image information retrieval system 12 could also extract from images provided by image source 22 corresponding index keys without having first stored the index keys in meta database 20. Retrieval system 18 includes a difference calculation processor 30, an ordering processor 31, and a fetch and display processor 32. In a preferred embodiment of the present invention, the images corresponding to the index keys which are "similar" to (i.e., have a relatively lower number of differences from) the query image index key are ordered based on the differences between their respective index keys and the query image index key. Alternatively, the images corresponding to the index keys which are "similar" to the query image index key could be simply determined to satisfy or not satisfy threshold criteria predetermined by the user.

The difference calculation processor 30 determines differences between an index key of a query image and index keys of the still images stored in meta database 20. The determination of differences between still images is explained in detail below.

The ordering processor 31 determines an order of the differences between the index keys extracted from the still images and the index key extracted from the query image.

The fetch and display processor 32 contains pointers for displaying still images whose index keys are stored in meta database 20. The still images may be stored locally or remotely, such as at a remote Web site on the INTERNET and archived using the index key extraction and archival process 16. In the foregoing example, if the still image is stored at a remote Web site on the INTERNET, fetch and display processor 32 tracks the INTERNET node of the still image, and location on the remote file system. Conventional processes are used to fetch the image from the location and to display it.

In a preferred embodiment of the present invention, each of the difference calculation processor 30, the ordering processor 31, and the fetch and display processor 32 is a software program, but could also be implemented in hardware or firmware.

Figure 10:
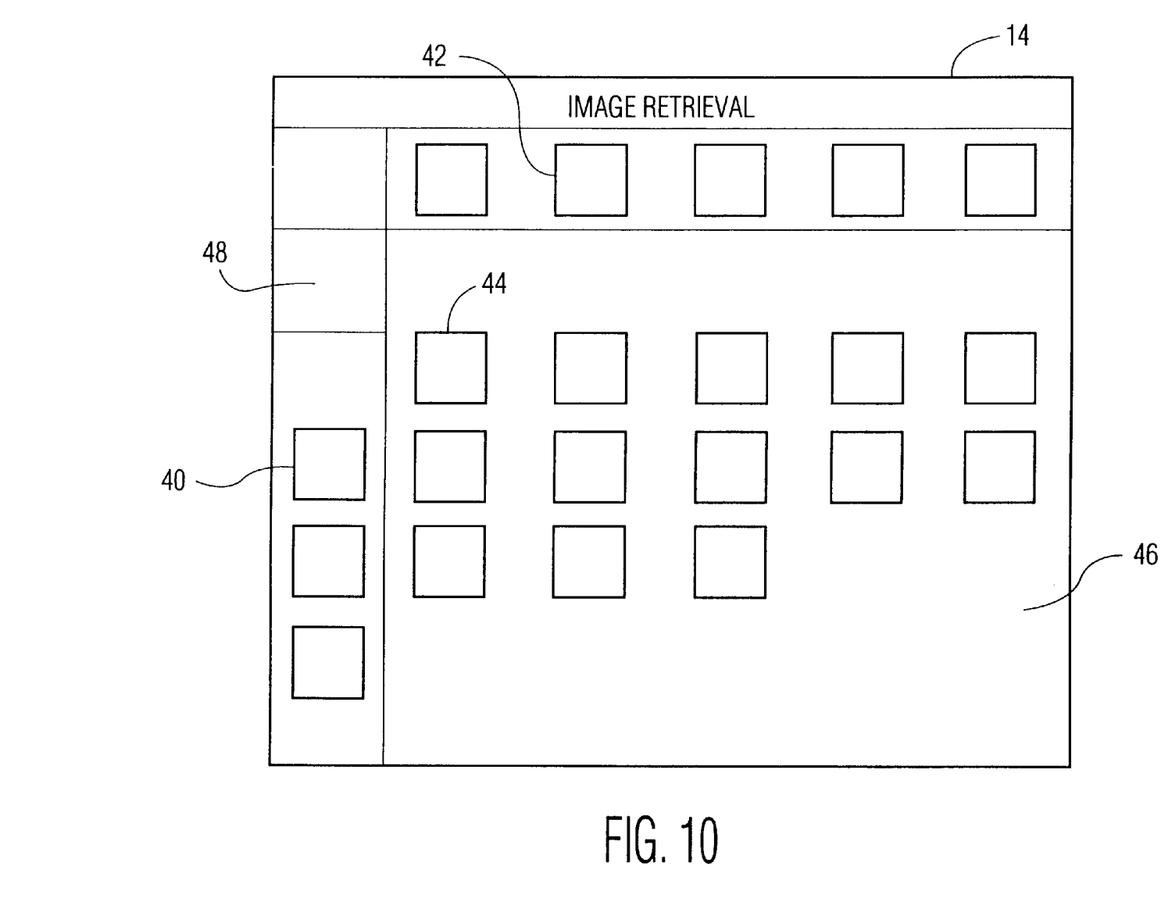
FIG. 10 is a display showing a demonstration of a query image and images retrieved by the present invention and displayed on a user interface.

User interface 14, in the present invention, is front end software being executed by a computer, in a preferred embodiment, and written using development kits, such as VISUAL C++™ or VISUAL BASIC™ in which a user can submit a still image as a query image and display search results. An example of a user interface 14 of the present invention is shown in FIG. 10, and explained with reference thereto.

In the present invention, the use of the DCT coefficients provided by the digital encoding of the image using the JPEG encoding standard to construct index keys is now explained.

Figure 4:
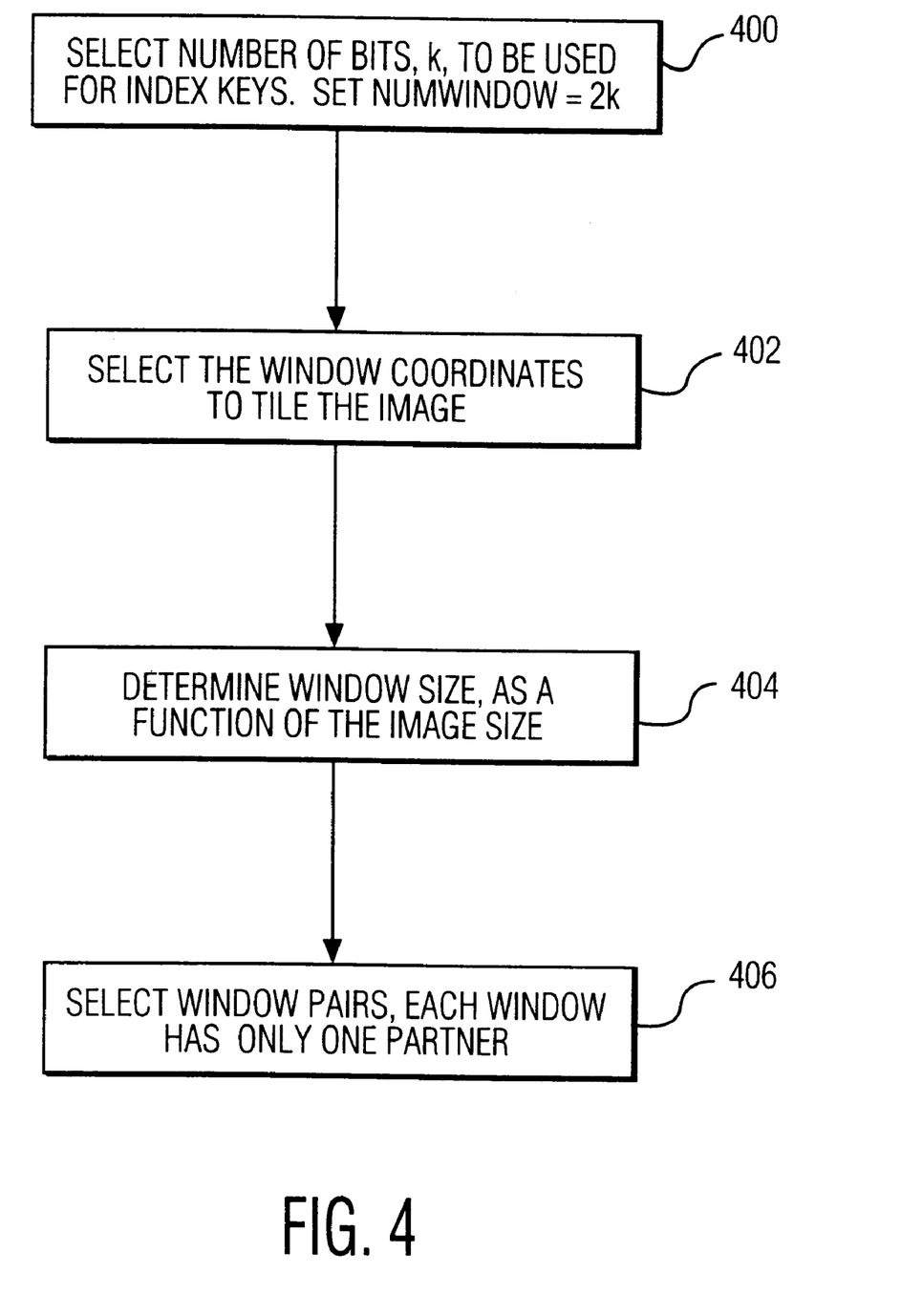
FIG. 4 is a flow chart describing selecting windows within a still image of the present invention.

FIG. 4 is a flow chart describing selection of windows within a still image in accordance with the present invention. In the present invention, the DCT coefficients provided by the JPEG-encoded image are used to construct a corresponding index key. One index key includes a plurality of coefficient keys, with one coefficient key corresponding to each DCT coefficient, as explained in the following paragraphs.

Referring to FIG. 4, as shown in step 400, the number of bits k is selected for the size of each coefficient key within the index key. The number of windows, then, is selected as twice (2k) the number of bits k. In a preferred embodiment, 8 bits (16 windows) is selected as the size of each coefficient key within the index key, although using 16 bits (32 windows) gives greater selectivity in retrieving images similar to the query image. Whether 8 bits or 16 bits or an even larger number is selected as the coefficient key size, the same number of bits must be selected for each coefficient key within each index key extracted from images being searched and from the query image. As explained in greater detail with reference to FIG. 8, if 16 bits are selected for the size of each coefficient key, and there are 64 coefficient keys (each coefficient key corresponding to one of the 64 DCT coefficients for each 8×8 block in the image for gray-scale images), then the total maximum size of the index key for each image is 128 bytes (2 bytes/coefficient key×64 coefficient keys).

Selecting a larger number of bits k, resulting in a larger number of windows 2k, means that fewer "tied" scores of differences between the index keys will occur, providing more selectivity in retrieving images similar based on a query image in accordance with the second aspect of the present invention. Although using 32 windows (16 bits) provides greater selectivity during the retrieval, greater selectivity does not necessarily provide more candidate images which are "similar" to the query image. Therefore, selecting a smaller number of windows (16) is better suited to the goal of the present invention of extracting similar images. If only the DC component is used for image retrieval, then selecting 32 windows is preferred.

As shown in step 402 of FIG. 4, window coordinates are selected to "tile", or cover, the image. The windows may be selected to fully cover the image or to be smaller samples of data. The shape of the windows may be square, rectangular, or some other shape, although a rectangular shape is preferred. In the present invention, since the coefficient key size is selected to be 16 bits, then the number of windows selected is 2×16=32. Accordingly, the number of pairs of windows for each image is then 16.

In step 404, the size of (number of pixels included in) each window may be arbitrarily selected, with all of the windows completely covering or not completely covering the image. In a preferred embodiment, windows do not overlap each other. Since the size of each image may vary, the size of each window is selected as a function of, and relative to, the size of the image. Each window within an image need not be the same size (i.e., the size of the first window need not be equal to the size of the 32nd window in each image); however, the size of each given window must be the same relative to the size of each image (the size of the first window in the first image must be equal to the size of the first window in the nth image, taking into account the relative difference in sizes between the first and nth images).

For compatibility with JPEG 8×8 blocks, the window is clipped in each dimension to the largest multiple of 8 less than the selected window size. Since the window size is a function of image size, the window size is normalized across all images in the method of the present invention. If JPEG chrominance and luminance values are also used, then the JPEG block size is adjusted and the window is clipped in each dimension to the largest multiple of the block size less than the selected window size.

Next, the windows within the image are randomly paired, with the constraint that each window has a partner. The window pairs must remain constant across all images being searched and the query image. In a preferred embodiment of the present invention, each window within each pair of windows should be selected "far" from the corresponding window within the window pair to minimize the possibility of each window within the window pair being from the same region of the image. For each image, the relationship of the DCT coefficients between each window in each window pair is used to build the coefficient keys, which then build the index key for the image. If both windows within each window pair are from the same region of the image, then the comparison between DCT coefficients from each window may not provide as meaningful of a result.

Each DCT coefficient in each window pair is then assigned to one of the bits in the index key, with a first bit of each coefficient key in the index key corresponding to the first window pair, second bit corresponding to the second window pair, etc. The value of each bit within the coefficient key is computed as explained with reference to FIG. 5.

Figure 5:
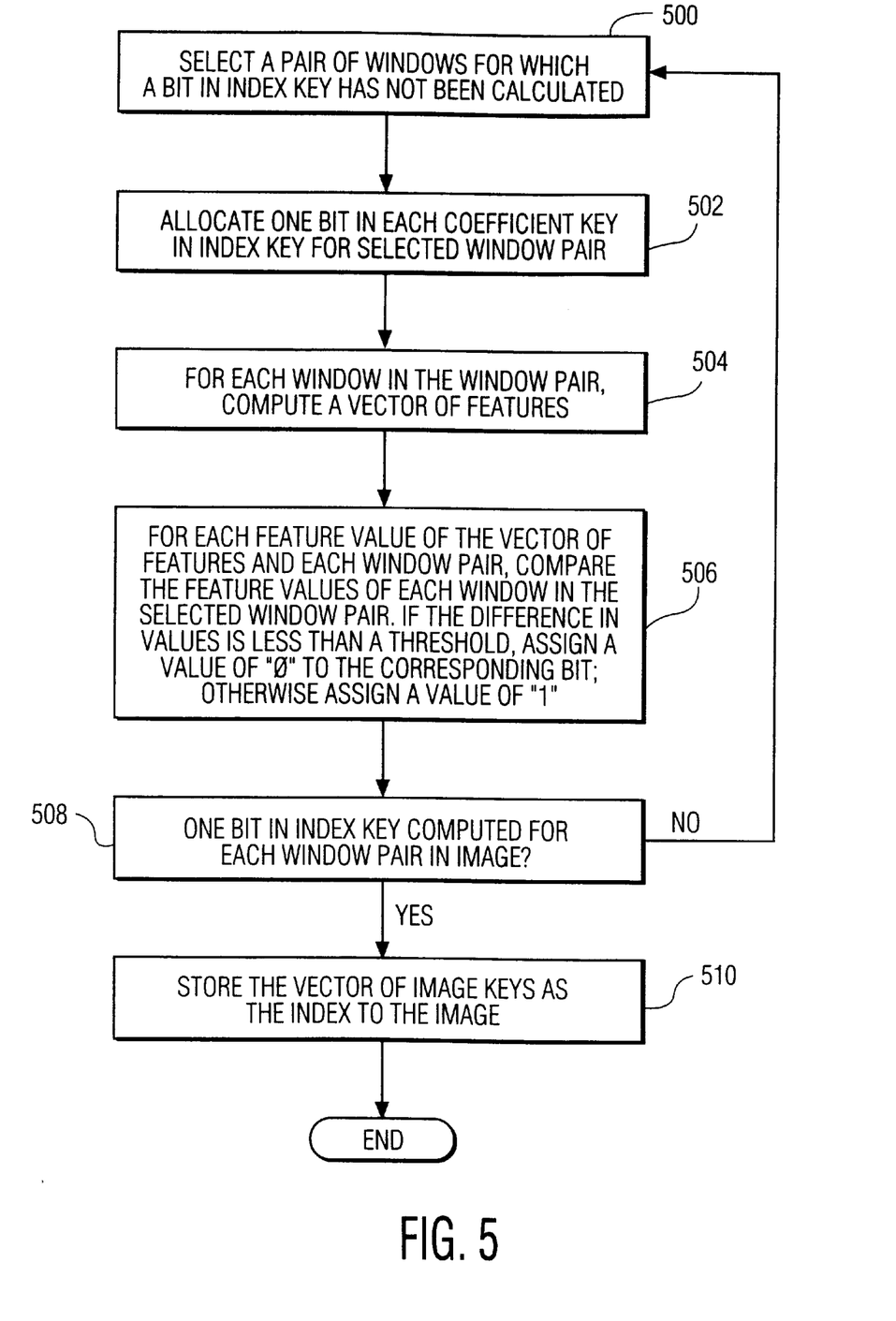
FIG. 5 is a flow chart of calculating index keys, in the present invention.

As shown in step 500 of FIG. 5, in forming an index key for an image, a pair of windows within that image is selected. Next, in step 502 one bit in each coefficient key in the index key for the image is selected for the window pair.

In a preferred embodiment, the same bit is allocated to the same, respective window pair in each image being compared.

In step 504, for each window in the window pair selected, a "vector of features" is calculated. The vector of features for one of the windows in the window pair comprises the DCT coefficients, conventionally computed as explained above, for each 8×8 block of the window. More specifically, the vector is a list of 64 DCT frequency components/coefficients for the block. If more than one 8×8 block exists in the window, then an average of each DCT coefficient over all of the 8×8 blocks in the window is taken, providing a vector of 64 feature values. The "vector of features" could also be any other arbitrary function applied to the window that computes a value representative of the window.

Then, for each feature value in the vector of features across all window pairs within the image, a coefficient key is calculated in step 506 as follows. For each feature value (and for each window pair), the value of a feature from the first window in the window pair is compared to the value of the same, respective feature in the corresponding window in the window pair. If the difference in the above-mentioned values is greater than a threshold value predetermined by the user, then a logical "1" is assigned as the corresponding bit in the coefficient key corresponding to the DCT coefficient. On the other hand, if the difference in the above-mentioned values is less than or equal to the threshold value, a logical "0" is assigned as the corresponding bit in the coefficient key corresponding to the DCT coefficient.

In a preferred embodiment of the present invention, the need for an explicit threshold value can be avoided by taking advantage of the JPEG compression scheme. Since the DCT coefficients are already quantized during JPEG compression, then if the value of the DCT coefficient from the first window in the window pair is greater than the value of the same, respective DCT coefficient from the second window in the window pair, a logical "1" is assigned to the corresponding bit (coefficient key) in the index key. Otherwise, a logical "0" is assigned to the corresponding bit in the index key. However, the differences must be greater than the step size used in the quantization of the DCT coefficients by the JPEG encoding method.

In addition in the present invention, the above-mentioned vector of features may be something other than the average of the DCT components from each 8×8 block in the window. For example, the vector of features may be the number of edge points in a particular window, the average of gray values within the window, or the variance of the gray values within the window. Accordingly, different definitions of the differences (and "similarity") between images may be used in the present invention. Further, in the present invention, multiple measures of the differences may be used for robustness or to capture specific features within the images. Therefore, more than one index key may be obtained for an image by changing the definition of the vector of features, as discussed above. In a preferred embodiment of the present invention, though, the DCT coefficients already computed by JPEG compression are used to compute the index key for each image.

Referring again to FIG. 5, in step 508, if one bit has not been computed for each DCT component in each window pair in the image, steps 500–508 are repeated. If all bits in the index key have been computed for the image, then in step 510 the index key is stored as the index to the image. A pointer to the image is also stored along with the index key. Accordingly, a database of index keys and pointers for each, respective image is established.

Figure 6:
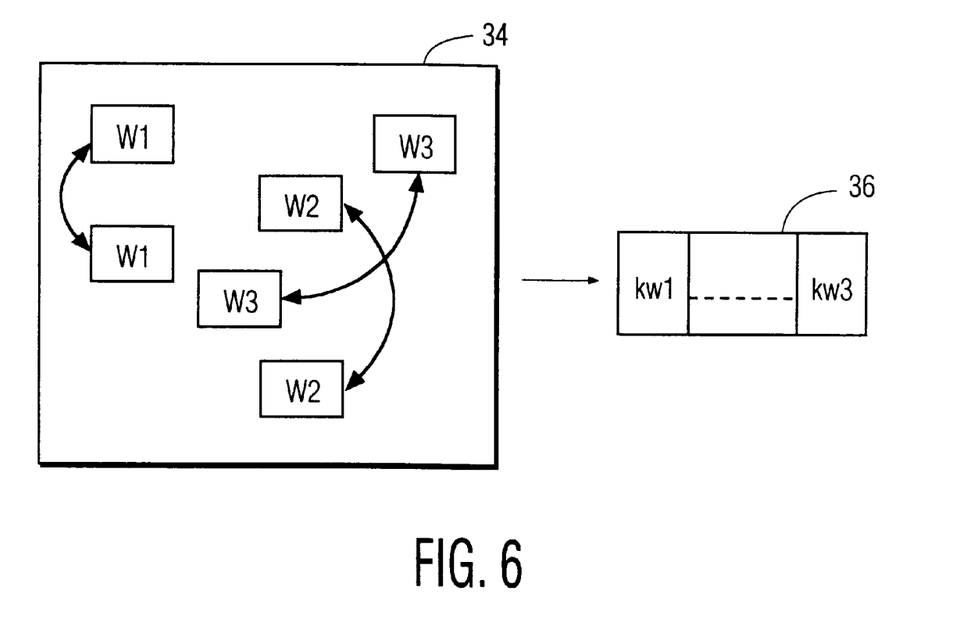
FIG. 6 is an example showing selection of window pairs and calculation of index keys within one image, in the present invention.

The index keys in the present invention are derived from relationships between window pairs, as shown in FIG. 6. For each image 34, a number of window pairs is selected, in which every window pair corresponds to one part of the index key 36. Therefore, the number of window pairs determines the length of the index key, as discussed with reference to FIG. 4. Each window of a window pair corresponds to one block of the image or region which covers multiple blocks in the image, in the example of FIG. 6. After comparing the DCT coefficients for each window in a given window pair, as discussed above, a bit value in coefficient key kw1 corresponding to the first DCT component comparison for the window pair w1–w1' is determined. Then, a bit value in the coefficient key kw1 corresponding to the first DCT component comparison for the window pair w2–w2' is determined, etc. Likewise, kw2 and kw3 are determined, in the example of FIG. 6.

As shown in FIG. 6, image 34 includes three examples of window pairs: w1 and w1', w2 and w2', and w3 and w3'. The positions of window pairs are selected in advance, but are fixed for the entire meta database 20 (shown in FIG. 3) of index keys and for an index key of an index still image. A single still image, accordingly, may have multiple index keys stored in multiple meta databases 20. For example, if one set of index keys, stored in one meta database 20, concentrating on the middle of images is desired, matching windows are chosen accordingly. On the other hand, if index keys stored in another meta database 20 are meant to correspond to background areas, window positions are chosen accordingly.

In the present invention, in a preferred embodiment, 16 window pairs exist for each image. Having 16 window pairs is preferred because computers most efficiently store binary numbers in groups of $2^n$, and unsigned integers are typically stored in 32 bits using many software compilers (for example, many compilers of C™ language computer software).

Figure 7:
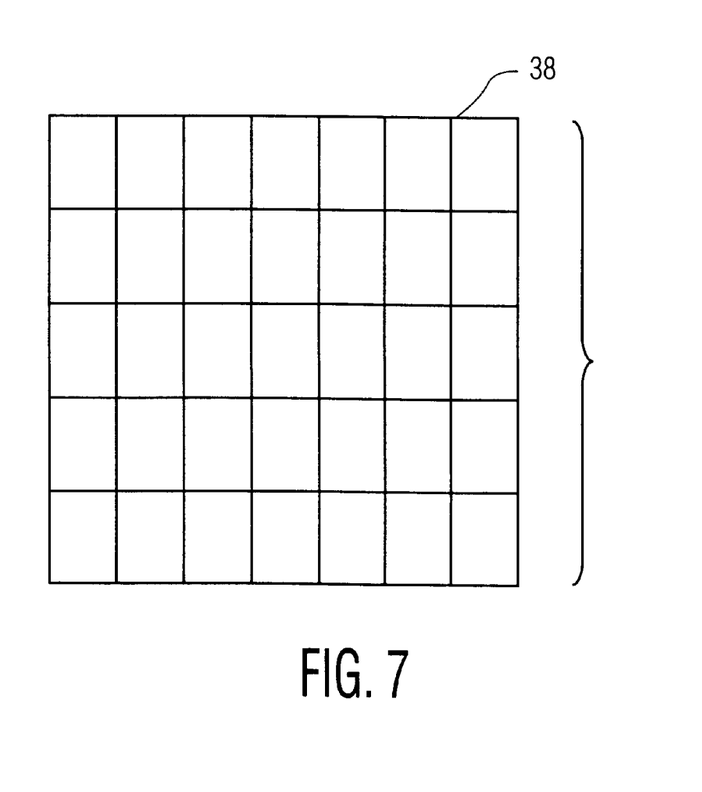
FIG. 7 shows the relationship between an image, a window, and a block, in accordance with the present invention.

FIG. 7 shows a block in a JPEG window 38 corresponding to an 8×8 pixel area. As previously discussed, more than one 8×8 pixel block may be included in each window. As noted previously, in the case of multiple 8×8 blocks in one window, the DCT coefficients are averaged to determine the values for that window. Also as previously discussed, most of the DCT coefficients are typically 0, meaning that the corresponding coefficient key is 0 and contributes little to the retrieval of similar images. Ignoring the zero values can result in substantial efficiencies, without necessarily reducing the effectiveness of indexing. Accordingly, if only 10 DCT coefficients are non-zero, then the index key would require only 20 bytes to be stored for the index key, with additional data being stored as the pointer to the corresponding image. The same relative bits and/or the same relative coefficient keys would need to be compared across all index keys to have a meaningful comparison and retrieval.

Figure 8:
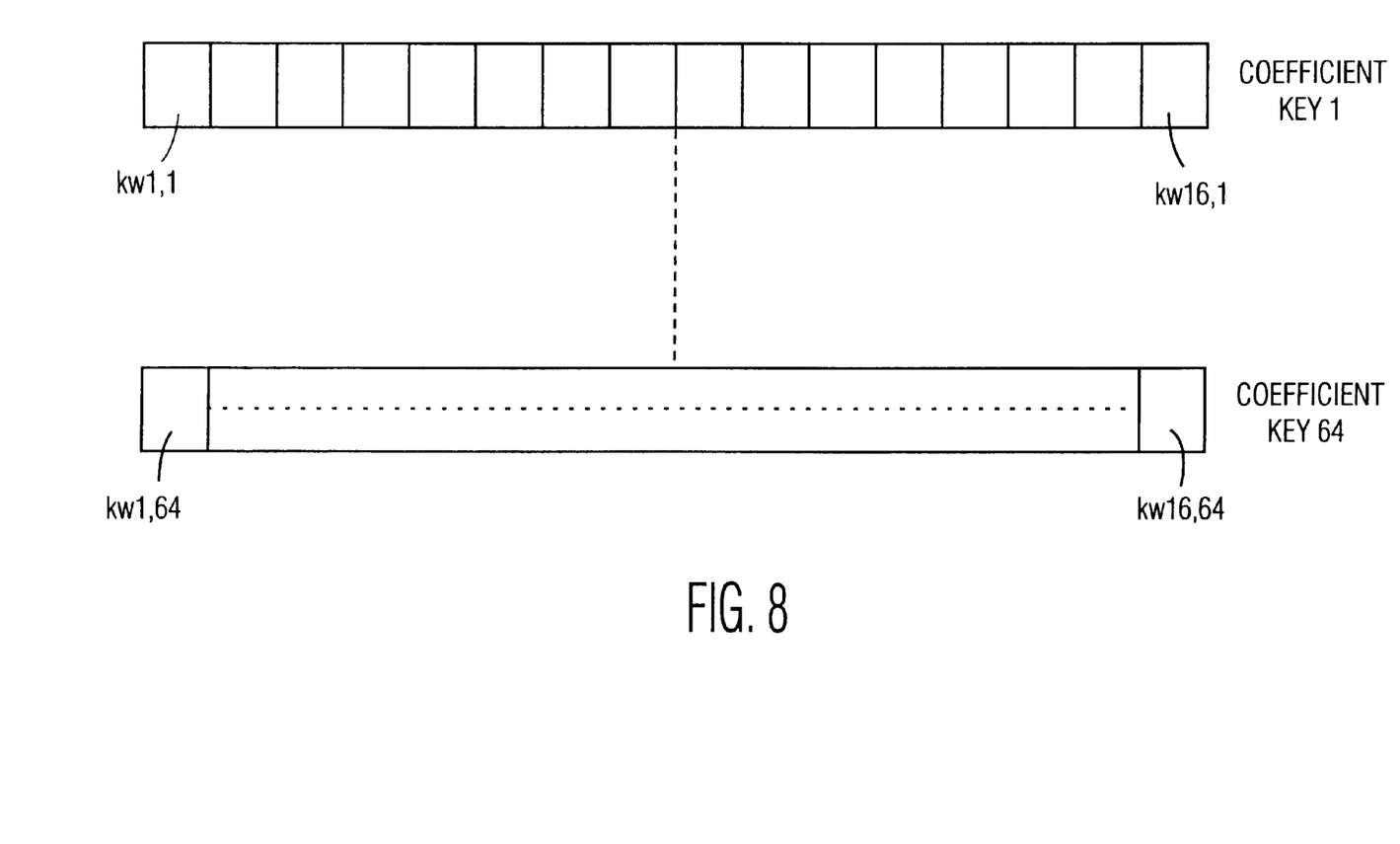
FIG. 8 is a diagram showing organization of coefficient keys within an index key in the present invention.

Referring now to FIG. 8, an organization of an index key for an image is shown. FIG. 8 shows an example of an index key corresponding to 16 window pairs. As shown in FIG. 8, coefficient key 1 contains bit kw1,1 through bit kw16,1. Bit kw1,1 is a result of comparison of the first DCT component in each window belonging to a first window pair. Bit kw16,1 is a result of comparison of the first DCT component in each window belonging to a sixteenth window pair. Coefficient key 64 contains bit kw1,64 through bit kw16,64. Bit kw1,64 is a result of comparison of the 64th DCT component in each window belonging to a first window pair. Bit kw16,64 is a result of comparison of the 64th DCT component in each window belonging to a sixteenth window pair.

A second main aspect of the present invention, retrieval of still images using the index keys, will now be described.

Figure 9:
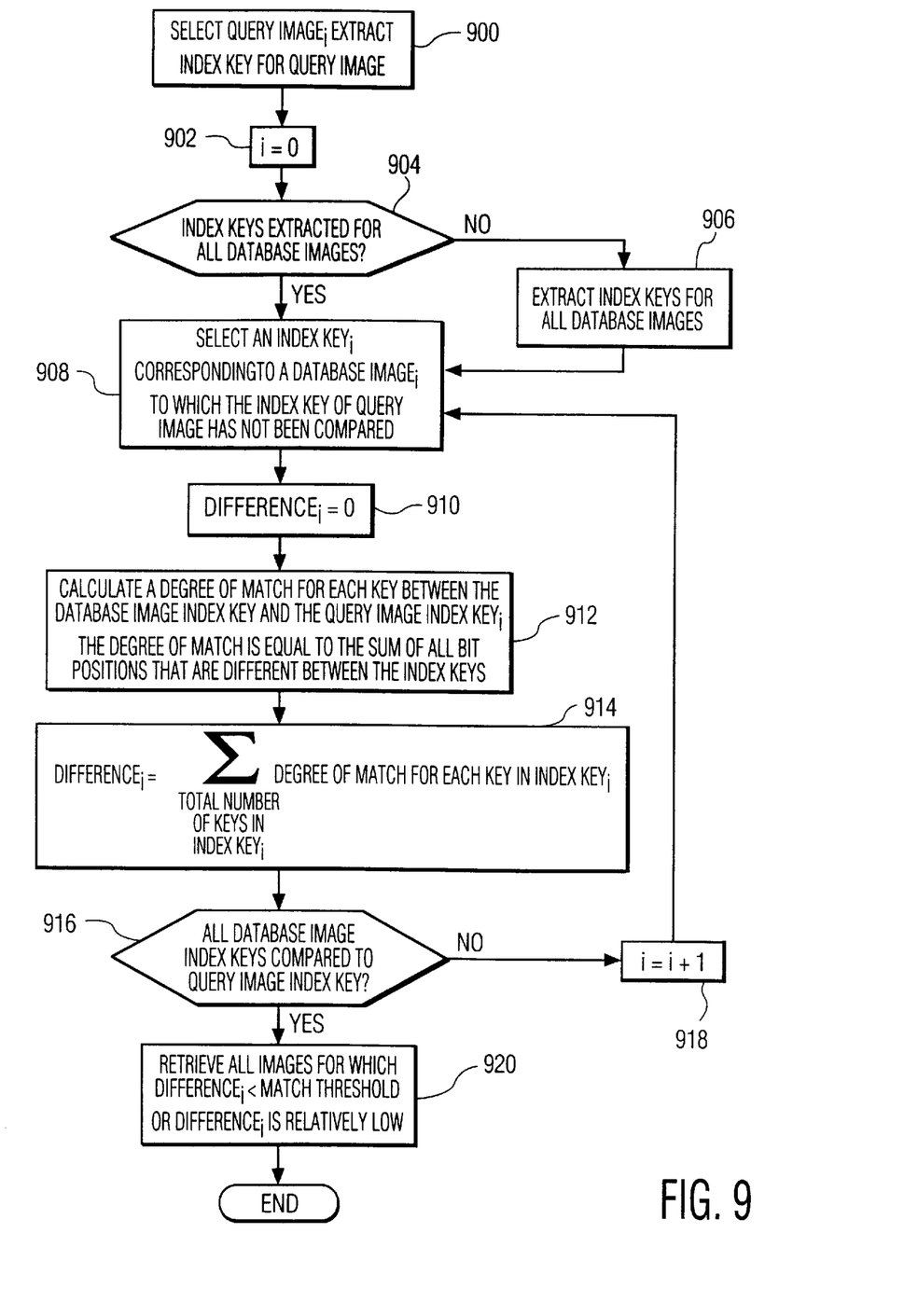
FIG. 9 is a flow chart showing calculation of differences between an index key for a query image and index keys for corresponding images searched, in the present invention.

FIG. 9 is a flow chart of the retrieval of images based on the index keys. In accordance with the present invention, image retrieval is based on differences between index keys extracted by the present invention as described above.

As shown in step 900, a query image (which is an image to which similar images are being identified and retrieved) is first selected. If the index key from the query image has not been extracted, then the query image index key is extracted at this point. Also in step 900, a source for the images being searched is selected. The source could be a database of images, or any one of the image sources described with reference to FIG. 3. All index keys are extracted based on windows at the same relative positions, and scaled based on image size.

In step 902, a counter i is initialized to 0. Counter i indicates the number of the index key being searched. In steps 904 and 906, if an index key corresponding to each image being searched has not been extracted, then the corresponding index key is extracted for each image.

In step 908, an index key corresponding to an image being searched is selected. The index keys need not be searched in any particular order because a difference between the query image index key and the index key being searched is determined based on whether a difference between the index keys being compared is less than a threshold.

Next, in step 910, a variable, difference$_i$, is initialized to 0. Difference$_i$ stores a total measure of differences between the two index keys being compared.

In step 912, a "degree of match" is calculated between each corresponding coefficient key in the index keys being compared, with each coefficient key corresponding to one of the 64 DCT coefficients. The "degree of match" is determined as the sum of all bit positions corresponding to the particular DCT coefficient that are different between the query image index key and the index key being searched.

As shown in step 914, the difference$_i$ between the query image index key and the index key$_i$ being searched is calculated as the total over all of the coefficient keys compared of the degree of match between the corresponding coefficient keys. Difference$_i$, then, is the total of the number of bit positions in which one of the two index keys being compared is storing "1" and the other of the two index key being compared is storing "0". For the above-mentioned calculation, the Hamming distance between the index keys being compared is used. For example, the Hamming distance measure between 0101 and 1011 is 3 because the number of different bits between 0101 and 1011 is 3. The difference$_i$ is stored as the difference between the query image index key and the index key$_i$. In the case of the present invention, there is one key for each DCT coefficient, making 64 coefficient keys per image, with each coefficient key having 16 bits.

The "best" match score (the match score or difference score indicating that the index key searched is most similar to the query image index key) between index keys compared is "0" (all coefficient keys are identical). The "worst" match score (the match score or difference score indicating that the index key searched is least similar to the query image index key) between index keys compared is "1024" (no keys are identical). In practice, depending upon the method by which the windows are selected and the number of DCT coefficients, the match scores are typically in the range of 0 to 200.

In steps 916 and 918, if all index keys being searched have not been compared to the query image index key, then counter i is incremented, and steps 908 to 916 are repeated.

Next, in step 920, each difference$_i$ is compared to the predetermined threshold, and all images for which difference$_i$ is less than the threshold are retrieved and presented to the user as being "similar" to the query image. Sensitivity of the search depends, in part, upon selection of the threshold value. If a larger threshold value, for example 150, is selected, then more matches are typically found and more images are returned. If a smaller threshold value, for example 90, is selected, then less matches are typically found, and less images are returned.

In the present invention, the similarity of the index keys compared to the query image index key can also be rank-ordered according to their difference scores. The ordered results of the images corresponding to the index keys determined to be "similar" to the query image can then be presented to the user to browse.

In the present invention, if the query image is a document, then other document images would return low difference scores (meaning that the other document images are more similar to the query image). If the query image is a passport photograph, then other passport photograph images would return low difference scores (meaning that the other passport photograph images are more similar to the query image).

The images returned as being similar to the query image could then be processed by a more sophisticated and restrictive set of algorithms with the expectation that most of the images to which the algorithms are applied will have similar characteristics.

FIG. 10 shows an example of an implementation of a user interface 14 described herein above with reference to FIG. 3. A user interface 14 shown in FIG. 10 is implemented using a TCL/TK tool kit running on an X WINDOWS™ platform. When a user selects "Search by Image" 40, a topic such as "NEWS" 42, and a query image 44 (which is shown as the upper left most icon in the work space for retrieval area 46), then the present invention searches extracted index keys from a meta database 20 (described herein above with reference to FIG. 3) and displays results of that search in the workspace for retrieval area 46. Resultant still images are ordered according to level of difference from the query image, from left to right across rows, then from top to bottom of columns. Screen window 48 displays a thumbnail (or reduced image) of a still image selected.

The present invention is not limited to the embodiments, described above, but also encompasses variations thereof.

For example, in the present invention, one DCT coefficient (the (0,0) or DC coefficient) may be used in computing difference measures for matching images. Further, choosing three, six, or ten of the DCT coefficients (in place of one DCT coefficient), which give symmetry about the diagonal of the 8×8 block when taken in the JPEG "zig-zag" order, yields differing index keys for the same image. In addition, as mentioned previously, the windows may be selected in differing sizes.

Search results depend upon window size and the number of coefficients used in constructing the index keys. For example, when all 64 coefficients are used, using a 16-window method produces better results than using the 32-window method. However, as the size of the database increases, the size of the coefficient keys are expected to need to be increased.

In addition, as the size of the windows increases, the 8×8 blocks within the samples may also be sampled, instead of using the average over all of them to determine the DCT coefficient for the window.

The JPEG compression scheme and analogous compression schemes are attractive for still image indexing and other image-processing operations because images encoded using them are encoded as a combination of spatial components and frequency components. The frequency components are band-pass filtered, which can be used to approximate image operations such as edge detection and texture analysis. The spatial coherence of the JPEG scheme enables adjacency relations to be retained, which is important for object detection and for syntactic methods that rely on relative positions or orientations of regions in an image.

In addition, the method of the present invention can be adapted to other compression schemes, such as wavelet-based methods.

The present invention allows retrieval of images given an image as a query. The present invention capitalizes on pre-processing already performed on JPEG-encoded images, allowing for images to be compared rapidly and a determination to be made with accuracy whether the image belongs to a same class as the query image.

As the use of images becomes more pervasive, and especially as more and more use is made of remotely-accessed image databases, the approach used by the present invention in classifying an image as a member of a class substantially reduces the burden of accessing images for remote browsing or for further processing.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An apparatus comprising:
   a source providing still images, said source comprising:
   a JPEG server providing the still images encoded using a JPEG encoding standard,
   a live image source providing the still images, and
   a network source providing the still images encoded using an encoding standard;
   an image information retrieval system, coupled to the source, extracting index keys from the still images and comparing an index key extracted from a query image to the index keys, said image information retrieval system comprising:
   an index key extraction and archival section one of encoding and partially-re-encoding using the JPEG encoding standard the still images if the still images are not encoded using the JPEG encoding standard, and extracting the index keys from the still images if the still images are encoded using the JPEG encoding standard,
   a database, coupled to the index key extraction and archival section, storing the index keys, along with identifying data of the respective still images corresponding to the index keys, and
   a retrieval subsystem, coupled to the database, comparing the index key of a query image with the index keys stored in the database, and determining difference between the index key of the query image and each of the index keys stored in the database, said retrieval subsystem comprising:
   a difference calculator calculating the difference,
   an ordering unit, coupled to the difference calculator, ordering the index keys based on the difference, and a fetch and display unit, coupled to the ordering unit, for retrieving still images corresponding to the index keys; and a user interface, coupled to the image retrieval subsystem, displaying the still images.

2. A method for classifying image data, the method comprising executing the following steps in a digital data processing device:

recognizing an even number of windows that are subsets of the image;

applying a mathematical function to image data in each of the windows to yield a respective numerical value for each of the windows;

pairwise associating the windows to define at least one pair of windows;

comparing the respective numerical values within each of the at least one pair to yield a respective comparison value for each of the at least one pair;

forming an index key from the respective comparison value; and embodying the index key in a medium readable by the digital data processing device.

3. A digital data processing device comprising:

a processor;

a device readable medium embodying the index key produced according to the method of claim 2.

4. The digital data processing device of claim 3 wherein the image data is a query image and the processor is adapted to retrieve images from a database using the index key as a query.

5. The digital data processing device of claim 3 wherein the image data is a data base image and the processor is adapted to match the index key to a query for retrieving the image data from the database.

6. The device of claim 5 wherein the medium also embodies the image data.

7. The device of claim 3 wherein the medium also embodies the image data.

8. The device of claim 3 wherein the processing device is adapted to accept user queries specifying a desired distance between a retrieved image and a query.

9. The device of claim 8 wherein the desired distance is specified by a Hamming measure.

10. The method of claim 2 wherein the image is a JPEG compressed image and each of the windows is a respective block resulting JPEG compression.

11. The method of claim 2 wherein the mathematical function comprises choosing a coefficient of the discrete cosine transform of each of the respective ones of the blocks.

12. The method of claim 2 wherein the coefficient is a DC coefficient.

13. The method of claim 2 wherein the mathematical function comprises an average of gray values in the window.

14. The method of claim 2 wherein the mathematical function comprises a variance of gray values in the window.

15. The method of claim 2 wherein the mathematical function comprises a number of edge points in the window.

16. A medium readable by a digital data processing device and embodying the index keys created by the method of claim 2.

17. The method of claim 2 wherein the image data comprises a stored database archive of images.

18. The method of claim 2 wherein the image data comprises a user-supplied query image.

19. The method of claim 2 wherein the image data comprises a stored database image.

20. The method of claim 2 wherein the processing step yields a plurality of index keys.

* * * * *